RADIAL TURBINE BLADE DAMPING DEVICE

Original Filed July 21, 1966 2 Sheets-Sheet 1

INVENTOR
Allan B. NEWLAND
ATTORNEY

RADIAL TURBINE BLADE DAMPING DEVICE

Original Filed July 21, 1966 2 Sheets-Sheet 2

INVENTOR
Allan B. NEWLAND

ATTORNEY

United States Patent Office

Re. 27,038
Reissued Jan. 26, 1971

27,038

RADIAL TURBINE BLADE DAMPING DEVICE

Allan Burrell Newland, St. Lambert, Quebec, Canada, assignor to United Aircraft of Canada Limited, Longueuil, Quebec, Canada Original No. 3,383,091, dated May 14, 1968, Ser. No. 566,844, July 21, 1966. Application for reissue Apr. 23, 1969, Ser. No. 826,762

Int. Cl. F01d *5/04, 5/10*

U.S. Cl. 416—242 8 Claims

Matter enclosed in heavy brackets [ ] appears in the original patent but forms no part of this reissue specification; matter printed in italics indicates the additions made by reissue.

*ABSTRACT OF THE DISCLOSURE*

*The blades of a rotating element which is subjected to having energy imparted to or extracted therefrom are constructed into a pair of axially separate sections abutting at a beveled or scarf joint for effectuating damping thereof.*

The present invention relates to radial, or centripetal, high velocity gas turbines, more particularly gas turbines for use in aircraft engines, and especially to an improvement in the construction of a turbine wheel leading to improved vibrational damping between the blades of the main turbine and exducer sections.

The wheels of centipetal turbines operate from a cylindrical input nozzle array, the gas entering in a radially inward direction and emerging in an axial direction. It is conventional to assemble the wheel from two axially separate sections, commonly called a leading or main section adjacent the input, and an exducer section adjacent the output, since the main section is subjected to higher temperatures than the exducer section and different materials may be employed, and aso for ease of casting and machining. The two sections are interconnected at the corresponding hubs for simultaneous rotation, but the blades, although the leading blades are aligned with the exducer blades, are not interconnected.

The incoming gas impulses may cause the blades to vibrate and such vibration is undesirable in that it leads to rapid fatigue of the blade material, particularly should a resonant condition arise. For this reason, means are normally provided for damping the vibrations of the blades. For the purpose of damping, it is known to cause a portion of the adjacent edges of each aligned pair of main and exducer blades to abut at a beveled or scarf joint. Conventionally, the direction of cut of the scarf joints is the same for each pair of blades, the direction being such that the leading blade will press against its following exducer blade under the normal direction of torque.

The applicant has found that a substantial improvement in performance can be obtained by directing the angle of the oblique cut in opposite directions in each pair of circumferentially adjacent blades.

Thus, in accordance with the invention, there is provided in a centripetal high velocity gas turbine wheel having an axis of rotation, axially separate leading and exducer wheel sections, each said section having a hub and blades extending radially from the hub, and the hubs being interconnected for simultaneous rotation, and the leading and exducer blades having respective adjacent edges aligned, the improvement in which the adjacent edges of each one leading blade and aligned exducer blade comprise:

recessed portions extending over part of their radial length from their roots, the recesses providing axial separation of said portions of the edges, and radially outer portions which are outwardly projected from the said recessed portions and which abut in a plane which in one dimension is radial and in the other dimension is oblique to the plane of the blades in said region, said oblique plane being directed oppositely with respect to said plane of the blades in each pair of circumferentially adjacent blades.

Preferably, the radially outer portions extend outwardly to the radial extremities of the blades, and preferably also, the oblique plane encloses an angle in the range of about 20° to about 60° with the said plane of the blades.

The advantages provided by the arrangement in accordance with the invention are as follows. In the conventional arrangement described, the leading and exducer sections are connected only at the hub so that substantial separation or misalignment of the blades may occur at or towards the radial extremities. With the arrangement of the present invention, on the other hand, there is a positive location of the leading and exducer sections both at the hub and at or near the peripheries, and the likelihood of permanent or incipient misalignment of the blades of the two sections is substantially eliminated. Furthermore, the conventional arrangement provides damping only under conditions of positive and constant torque in a single direction, and torque is only transmitted from a leading blade to an exducer blade. However, the direction of torque does not remain constant in operation, and the reversal of the direction of torque may occur. In the conventional arrangement, under such circumstances, not only does the arrangement fail to provide sufficient damping, but there is no torque transmission except through the hub, which leads to strain at the roots of the blades. In the arrangement of the present invention, half the blades are transmitting torque either in one direction or the opposite direction, so that constant torque transmission is obtained. In the blades that are not at one moment transmitting torque at the scarf joints, damping still operates, since the parts in abutment are maintained in such position by axial preload by means of the centre bolt 14.

These improvements lead to substantially greater longevity and safety in the turbine.

Having thus generally described the invention, an embodiment thereof is hereafter more particularly described with reference to the following drawings, in which.

Figure 1:
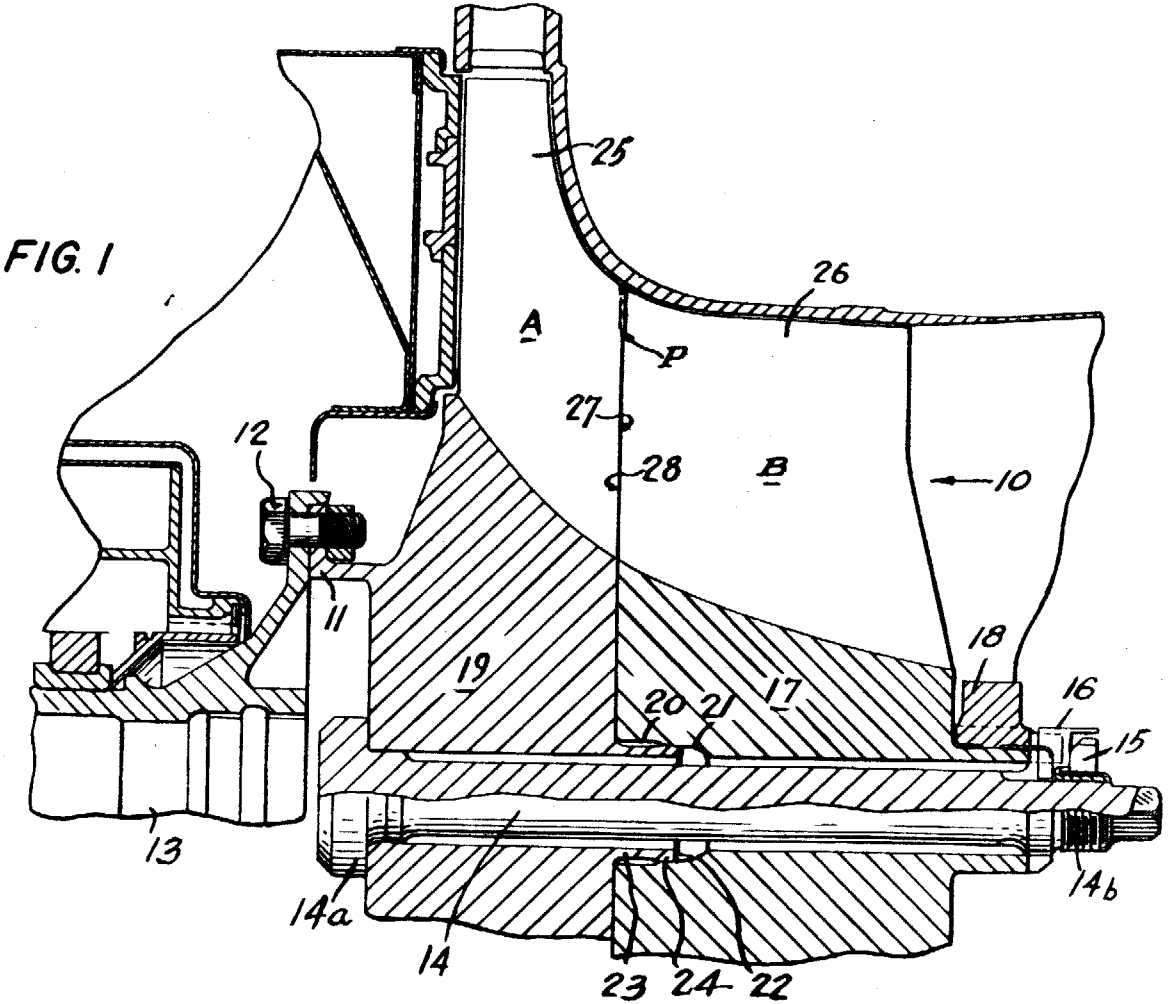
FIGURE 1 is an axial section through the turbine wheel and adjacent parts of a centripetal gas turbine forming part of an aircraft engine.
Figure 2:
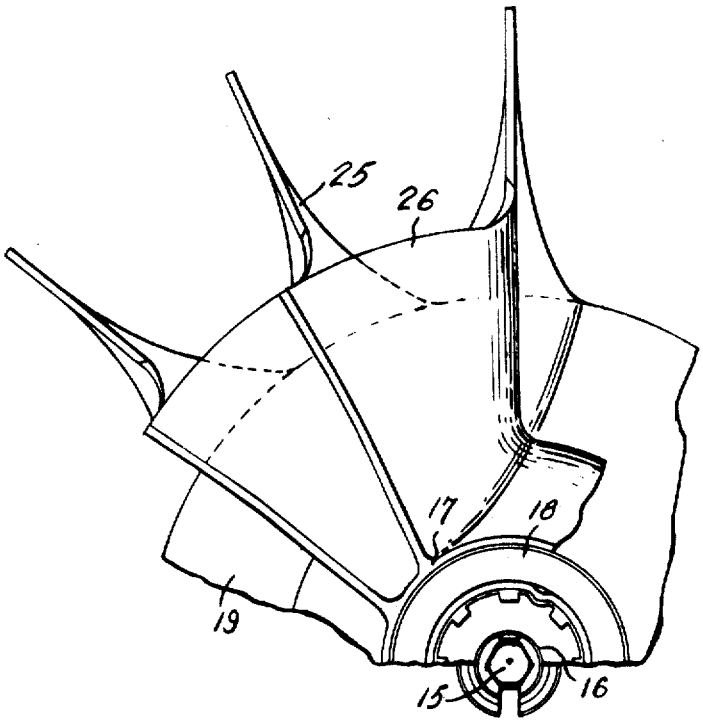
FIGURE 2 is an end elevation of part of the turbine wheel shown in FIGURE 1 viewed from the right-hand side as in FIGURE 1.
Figure 4:
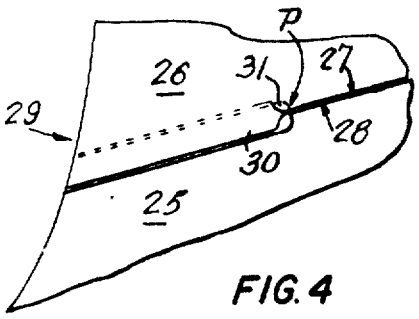
FIGURE 4 is a view on the same scale as FIGURE 3 of one of the scarf joints, viewed as in FIGURE 1.

In the drawings, there is shown a centripetal turbine wheel 10 having a leading or main section A and an exducer section B, which are separately formed. Although the separately formed sections are so called for convenience, the word "exducer" normally covers the output side of the turbine in general, so that the output side of section A might be considered in general as part of the exducer.

The wheel 10 is provided with a flange 11 by which it is connected through bolts 12 to the main axle 13 of the turbine. An axial bore extends through the turbine wheel, and the sections A and B are held together by a bolt 14 which extends through the bore. The head 14a of the bolt abuts against the axial region of the hub of leading section A, and threads 14b at the far end of the bolt are engaged by a nut 15 which acts through a cup washer 16 and a balancing wheel 18 against the axial region of exducer section B. The output end of the hub 17 of exducer section B is stepped to take the balancing wheel 18. The bolt 14 is recessed over a major part of its length to clear the bore through the turbine wheel. The adjoining hub portions 17 and 19 of the two sections of the wheel meet and abut in the cross-sectional plane of separation. Thus, the bore through the hub portion 17 is recessed firstly at 20 to provide an area of clearance, and secondly, at 21. The hub portion 19 of the main section A is formed with an axially extending spigot 22 adjacent the axis. The spigot 22 has a narrow shank portion 23 and an enlarged end portion 24 which is arranged to engage frictionally the recessed bore portion 21 as the nut 15 is tightened.

Leading blades 25 are joined at their roots to leading hub portion 19 and constitute with the hub portion 19 the leading or main section A. Exducer blades 26 extend in corresponding number and position from the hub portion 17 and constitute with such hub portion the exducer section B.

Each of the leading blades 25 is aligned with one of the exducer blades 26 along the plane of separation shown in FIGURE 1. The adjacent edge 27 of each leading blade 25 and the adjacent edge 28 of the corresponding aligned exducer blade 26 are each recessed from the roots outwards up to a point P which is short of the radial extremity of the blades, so that over the recessed portions the edges 27 and 28 are axially separated by a gap, in the preferred embodiment, of .002 inch minimum. Between the point P and the periphery 29 of the blades, the edges of the aligned blades comprise portions 30, 31 which project outwardly so as to abut one with the other. The plane of abutment is in each case oblique to provide a scarf joint between the portions 30 and 31. More accurately, the plane is in each case radial in one dimension and oblique to the plane Q of the blades in the abutting region. As shown more particularly in FIGURE 3, the planes R1, R2 of abutment in each pair of circumferentially spaced blades is in opposite sense. In the preferred case, the angle enclosed between each of the planes R1, R2 and the plane Q of the blades is approximately 45°, so that the planes R1, R2 are disposed approximately at right angles one to the other.

Figure 3:
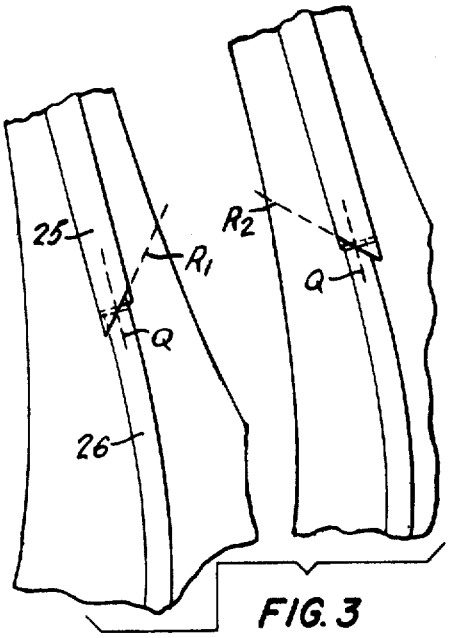
FIGURE 3 is a greatly magnified view towards the axis of a circumferentially adjacent pair of blades, showing the direction of cut of the scarf joints.

As shown more particularly in FIGURE 3, the exducer blades 26 are not necessarily of the same thickness as the leading blades 25, but as shown, are thinner.

It will be appreciated that every alternate pair of circumferentially spaced blades has the plane of abutment R1, for example, in the same sense so that these blades will transmit torque when the direction of torque is in the right direction, whereas when the torque is reversed, the pairs of alternate blades which fall between the first pairs will transmit the torque. However, there is always positive location or abutment between the leading blades 26 and the exducer blades 25.

It will be appreciated that by use of this characteristic of the invention, not only is there positive location of the ends of the blades, but damping is increased substantially, irrespective of the direction of torque. Furthermore, since there is positive torque transmission at the periphery of the blades, less precautions need be taken over the transmission of torque at the hub; for example, expensive splined joints may be omitted and a simple frictional joint of the type described may be used perfectly satisfactorily.

The distance from the periphery of the blades to the point P is preferably within a range from about a quarter to about a half of the whole length of the edges 27, 28.

The turbine wheel described and illustrated also forms part of a copending patent application Ser. No. 585,013, filed Oct. 7, 1966 to H. H. Langshur entitled "Improved Exducer Trailing Edge Fairing in a Radial Turbine."

The turbine described and illustrated in the drawings is further described in copending application Ser. No. 572,338, filed Aug. 15, 1966 to A. Neath, A. Newland, and A. Strelshik and entitled "Radial Turbine Shroud Construction."

I claim:

1. In a centripetal high velocity gas turbine wheel having an axis of rotation, axially separate leading and exducer wheel sections, each said section having a hub and blades extending radially from the hub, and the hubs being interconnected for simultaneous rotation, and the leading and exducer blades having respective adjacent edges aligned, the improvement in which the adjacent edges of each one leading blade and aligned exducer blade comprise:

recessed portions extending over part of their radial length, the recesses providing axial separation of said portions of the edges, and remaining portions which are outwardly projected from the said recessed portions and which abut in a plane which in one dimension is radial and in the other dimension is oblique to the plane of the blades in said region, said oblique plane being directed oppositely with respect to said plane of the blades in each pair of circumferentially adjacent blades.

2. The improvement of claim 1 wherein said remaining portions extend outwardly to the radial extremities of the blades from a position intermediate the length of said adjacent edges.

3. The improvement of claim 1 wherein the said remaining portions are of a length within the range of about a quarter to about a half of the total length of said adjacent edges.

4. The improvement of claim 2 wherein said oblique plane encloses an angle in the range of about 20° to about 60° with said plane of the blades.

5. The improvement of claim 4 wherein the said angle is approximately 45°.

6. The improvement of claim 1 wherein said remaining portions extend outwardly to the radial extremities of the blades from a position intermediate the length of said adjacent edges, said remaining portions being of a length within the range of about a quarter to about a half of the total length of said adjacent edges, and wherein said oblique plane encloses an angle in the range of about 20° to about 60° with said plane of the blades.

7. The improvement of claim 1 wherein the said interconnection of the hubs is effected by an annular spigot surrounding said axis of rotation of one of said sections engaged frictionally in a corresponding recess in the other of said sections, the sections being held together by bolt means passing through said axis of rotation.

*8. In a rotating machine including a wheel having an axis of rotation and subjected to impart movement by or to a fluid,*

*axially separate forward and aft wheel sections, each said section having a hub and blades extending radially from the hub, and the hubs being interconnected for simultaneous rotation,*

*said forward blades and said aft blades having respective adjacent edges aligned, the adjacent edges of each one forward blade and aligned aft blade comprise:*

*recessed portions extending over part of their radial length, the recesses providing axial separation of said portions of the edges, and*

*remaining portions which are outwardly projected from the said recessed portions and which abut in a plane which in one dimension is radial and in the other dimension is oblique to the plane of the blades in said region,*

*said oblique plane being directed oppositely with respect to said plane of the bades in each pair of circumferentially adjacent blades.*

References Cited

The following references, cited by the Examiner, are of record in the patented file of this patent or the original patent.

UNITED STATES PATENTS

| | | | |
|---|---|---|---|
| 2,405,283 | 8/1946 | Birmann | 416—132 |
| 2,646,920 | 7/1953 | Butcher | 416—132 |
| 2,664,240 | 12/1953 | Gorton | 416—184 |
| 2,859,933 | 11/1958 | Whitaker | 416—183 |
| 2,941,780 | 6/1960 | Von Der Nuell et al. | 416—500X |
| 3,383,091 | 5/1968 | Newland | 416—242 |
| 3,384,345 | 5/1968 | Neath et al. | 415—182 |
| 3,412,978 | 11/1968 | Keenan et al. | 415—212 |
| 3,424,433 | 1/1969 | Langshur | 416—237 |
| 3,167,301 | 1/1965 | Whitaker | 253—77X |

FOREIGN PATENTS

| | | | |
|---|---|---|---|
| 1,148,335 | 4/1969 | Great Britain | 416—500 |

EVERETTE A. POWELL, JR., Primary Examiner

U.S. Cl. X.R.

416—500